United States Patent

Gaillard

Patent Number: 5,567,021
Date of Patent: Oct. 22, 1996

[54] POWER-ASSISTED BRAKE SYSTEM

[75] Inventor: Alain Gaillard, Karlsruhe, Germany

[73] Assignee: Robert Bosch GmbH, Stuttgart, Germany

[21] Appl. No.: 491,898

[22] PCT Filed: Dec. 13, 1994

[86] PCT No.: PCT/DE94/01476

§ 371 Date: Jul. 14, 1995

§ 102(e) Date: Jul. 14, 1995

[87] PCT Pub. No.: WO95/16593

PCT Pub. Date: Jun. 22, 1995

[30] Foreign Application Priority Data

Dec. 18, 1993 [DE] Germany ............ 43 43 314.6

[51] Int. Cl.$^6$ ............ B60T 13/14; B60T 8/40; B60T 7/06; B60T 13/66
[52] U.S. Cl. ............ 303/3; 188/358; 303/113.4; 303/114.1; 303/155; 303/DIG. 3; 303/DIG. 4
[58] Field of Search ............ 303/155, 166, 303/113.4, 114.1, 114.2, 113.3, 113.2, 116.1, DIG. 3, DIG. 4, 3, 15, 20, 13, 14, 115.1; 188/355–360; 60/545, 547.1

[56] References Cited

U.S. PATENT DOCUMENTS

| | | | |
|---|---|---|---|
| 4,327,414 | 4/1982 | Klein | 303/155 |
| 4,462,642 | 2/1984 | Leiber | 303/113.4 |
| 4,489,989 | 12/1984 | Belart et al. | 303/114.2 |
| 4,715,661 | 12/1987 | Leiber | 303/114.1 |
| 4,919,493 | 4/1990 | Leiber | 303/113.4 |
| 5,031,968 | 7/1991 | Takata | 303/155 |
| 5,178,441 | 1/1993 | Heibel et al. | 188/356 |

FOREIGN PATENT DOCUMENTS

| | | |
|---|---|---|
| 2327508 | 12/1974 | Germany . |
| 4102497 | 5/1992 | Germany . |
| 9218361 | 10/1992 | WIPO . |

*Primary Examiner*—Douglas C. Butler
*Attorney, Agent, or Firm*—Edwin E. Greigg; Ronald E. Griegg

[57] ABSTRACT

A power-assisted brake system which can be activated by a pedal including a travel simulator and a desired value transmitter which is coupled thereto and a second sensor which can be used alternatively as a desired value transmitter. The second desired value transmitter is a pressure transmitter. The signals of both desired value transmitters are monitored in an electronic control unit for essentially corresponding signal values. If there is an unacceptable difference in signal value, power-assisted braking operation is suppressed. Braking is then possible by an emergency brake cylinder. The power-assisted brake system can be used for motor vehicles for passenger transport and goods transport, in motor vehicles which are equipped with an anti-lock brake system (ABS) or with a traction control system (TCS).

20 Claims, 4 Drawing Sheets

POWER-ASSISTED BRAKE SYSTEM

PRIOR ART

The invention is based on a power-assisted brake system. Such a brake system is known from the publication DE 23 27 508 A1.

Such a power-assisted brake system has an electric desired value transmitter for electrically controlling the power-assisted braking in order to be able to set the brake pressures in the wheel brake cylinders as a function of the selected force of the driver's foot. No pedal travel is actually required when absorbing the selected force of the foot on the pedal. However, for ergonomic reasons it is— as is customary in conventional brake systems— very advantageous if the driver senses the pedal travel as a function of the force exerted on the pedal by his foot when he activates the brake. Therefore, a travel simulator is used in this power-assisted brake system.

In the known, electrically controllable power-assisted brake system, the travel simulator which contains a compressible simulator spring is arranged between the pedal and an emergency brake cylinder. Every time the pedal is activated, the simulator spring is compressed and the electric desired value transmitter, to which an electronic control unit is connected, is adjusted. The hydraulic power assistance being applied and the brakes being actuated by means of the said electronic control unit with the aid of solenoid valves. In the event of the hydraulic power assistance or the control unit failing, the pedal must be depressed still further in order to produce emergency brake pressure by displacing emergency braking pistons in the emergency brake cylinder and ultimately in the wheel brake cylinders.

In another dual-circuit power-assisted brake system known from GB-PS 20 84 275, a travel simulator with a simulator cylinder, with a simulator spring and with a piston is provided on a dual-circuit emergency brake cylinder, which piston is displaced by a hydraulic pressure starting from the emergency brake cylinder when the pedal is moved, i.e. the pistons in the emergency brake cylinder must first experience travel in order to produce an activation pressure for the travel simulator. Moreover, the travel simulator includes a nonreturn valve which normally closes off an opening in the simulator cylinder and can be opened under the control of pressure from the power-assistance source so that the simulator spring can only be compressed in power-assistance operation. If the power assistance fails, pressure fluid enclosed in the simulator cylinder prevents the simulator spring being compressed so that one pedal stroke in all is available to displace the emergency brake cylinder pistons for pump work producing the brake pressure. It is an advantage in terms of production technology that the simulator cylinder has the same diameter as the dual-circuit emergency brake cylinder and is formed onto it integrally, coaxially to it in the manner of an extension. In order to introduce a pressure medium from the hydraulic power-assistance source into the two brake circuits leading to the wheel brakes, to produce brake pressure, two hydraulically controllable brake pressure control valves are provided. The hydraulic control is achieved by means of pressure from two cylinder chambers of the dual-circuit emergency brake cylinder. Using electromagnetically controllable directional control valves in the brake circuits between the brake pressure control valves and the wheel brakes, this power-assisted brake system is developed in order to avoid the risk of wheels locking. U.S. Pat. No. 43 27 414 discloses a power-assisted brake system with an electrical control logic, with at least one electrically controllable pressure modulator and with a brake signal transmitter which can be adjusted by the pedal and whose electrical output signal is processed as a desired value of the desired vehicle deceleration in the control logic. In order to increase the operational capability, the brake signal transmitter is constructed in such a way that it simultaneously transmits two mutually independent redundant signals to the control logic. Transmission faults can be detected and possibly eliminated. This power-assisted brake system has no emergency brake cylinder which can be activated by the pedal.

ADVANTAGES OF THE INVENTION

The power-assisted brake system according to the invention has the advantage that in power-assistance operation quantities of pressure medium which are to be discharged from wheel brakes can be carried away through at least one emergency brake line and the emergency brake cylinder to its reservoir.

By means of the measures specified herein, advantageous developments and improvements of the power-assisted brake system disclosed are possible. The defining features provide the advantage that whenever braking occurs the locking piston and at least one piston of the emergency brake cylinder are displaced to such an extent that jamming in the associated cylinders is avoided. The defining features give a constructial exemplary embodiment of the extension chamber.

The defining features give rise to the advantage that the simulator spring can only be compressed during power-assisted braking operation therefore during emergency operation, virtually the entire pedal stroke is available to displace the at least one piston of the emergency brake cylinder. Thanks to the electrical controllability of the solenoid valve, the travel simulator can rapidly become blocked if the power-assistance source fails. The defining features herein give rise to the advantage that overall length is reduced.

The defining features herein give rise to the advantage that the sensor used to acquire a travel simulator travel signal is located at a sufficient distance from a pedal plate of the pedal, as a result of which damage to the sensor by a driver's foot is avoided.

The defining features herein give rise to the possibility that, instead of using a sensor, such as a pivot angle sensor, which is intended for travel simulator travel measurement, a pressure signal is used which is dependent on a force exerted on the pedal.

The defining features herein give rise to the advantage that the operational capability of a sensor, such as a travel sensor or/and pressure sensor, used for electrical control of the power-assisted brake system can be monitored, power-assisted braking operation being suppressed for example if the sensor is defective.

BRIEF DESCRIPTION OF THE DRAWING

Several exemplary embodiments of the invention are illustrated in the drawing and explained in greater detail in the subsequent description.

DETAILED DESCRIPTION OF THE EXEMPLARY EMBODIMENTS

Figure 1:
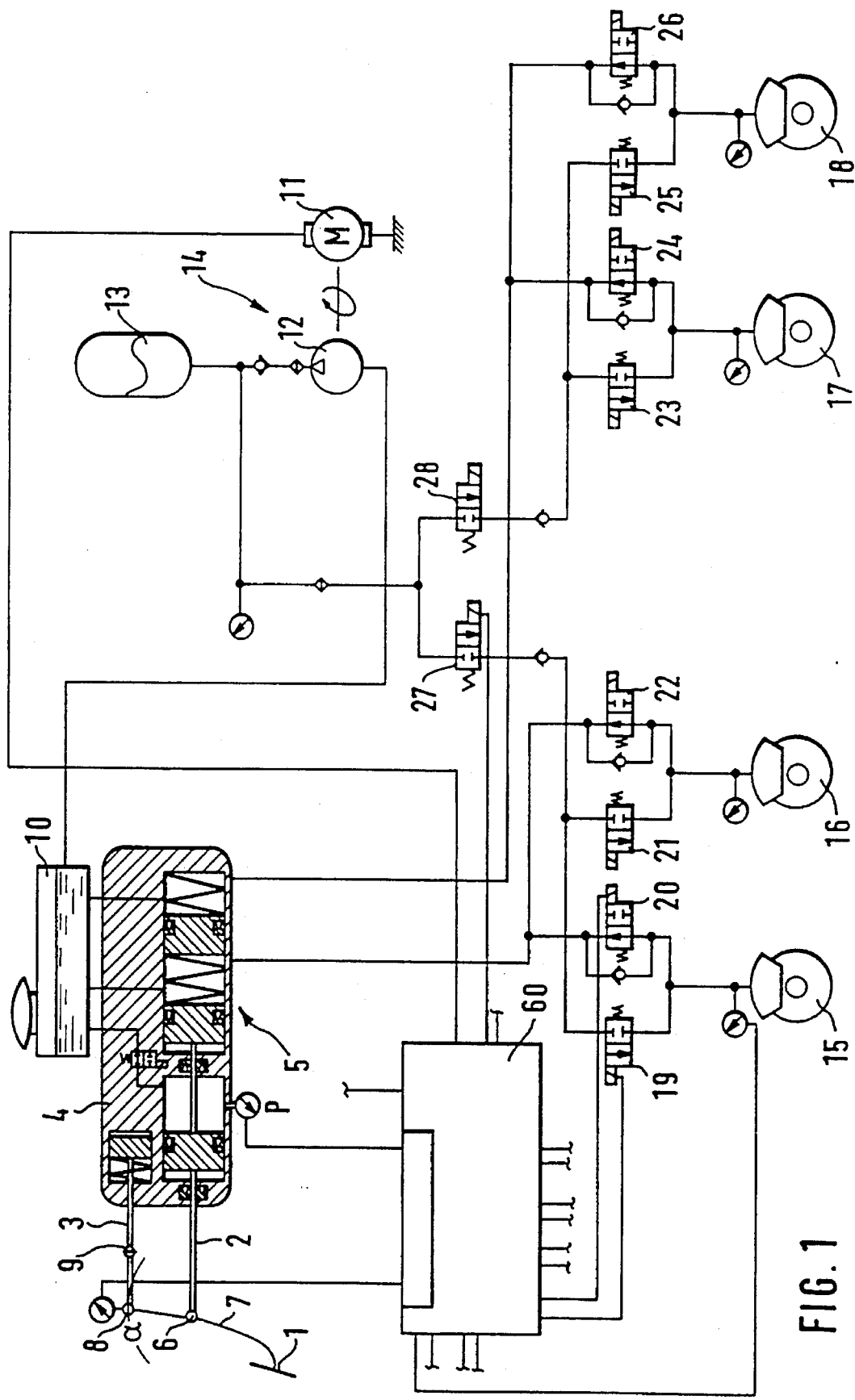
FIG. 1 shows the power-assisted brake system according to the invention.

A power-assisted brake system has a pedal 1 which can be activated by the driver and is connected via two piston rods 2 and 3 to a piston unit 5 which is enclosed by a housing 4. One piston rod 2 has a coupling point 6 approximately in the center of a pedal lever 7 and the other piston rod 3 is received by a coupling point 8 at the end of the pedal lever 7 facing away from the pedal 1. The latter piston rod 3 has a joint 9 so that its end facing the pedal lever 7 can deflect. A fluid reservoir 10 which can also be referred to as an upper container is arranged on the housing 4.

The power-assisted brake system is equipped with an electric motor 11 which drives a pump 12 which sucks fluid out of the reservoir 10 and forces the fluid into an accumulator 13. The motor 11, pump 12 and accumulator 13 form a power-assistance provision unit 14 which usually produces the brake pressure in the system.

The rest of the brake system is designed for example as an anti-lock brake system. For each wheel brake 15, 16, 17 and 18 it has a pair of 2/2-way solenoid valves 19/20, 21/22, 23/24 and 25/26, and in each case a 2/2-way solenoid valve 27 or 28 is also connected upstream of the solenoid valves of the wheel brakes. Using wheel speed sensors (not illustrated) and an electronic control unit, the aforesaid solenoid valves can give rise to the pressure increasing, pressure maintaining and pressure reducing braking phases. If the power assistance and/or the electronics fail, the solenoid valves 20, 22, 24 and 6 are switched to their open position so that there is a free passage from the piston unit 5 to the wheel brakes 15, 16, 17 and 18.

Figure 2:
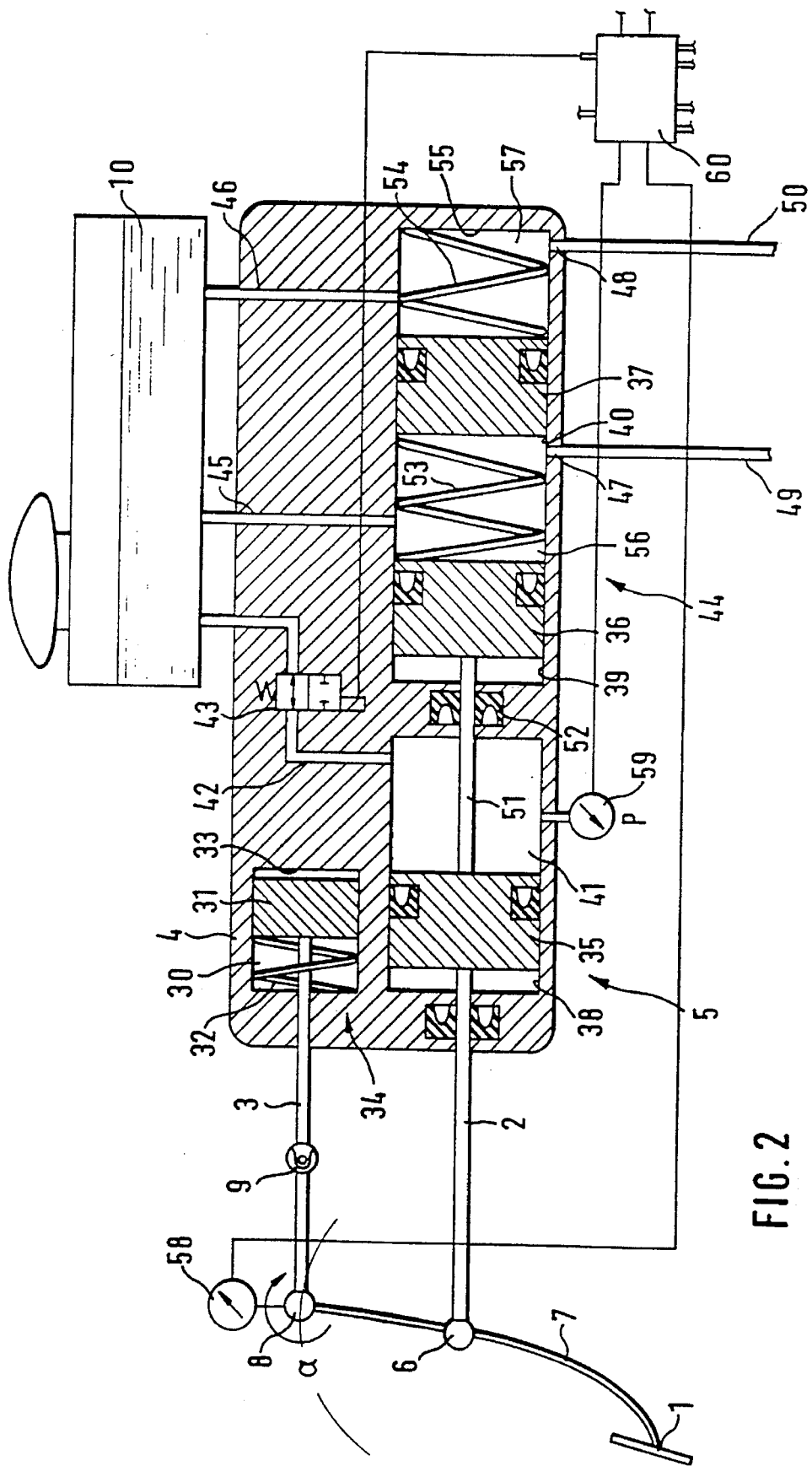
FIG. 2 shows the emergency brake cylinder with the travel simulator on an enlarged scale.

In FIG. 2, the piston unit 5 is illustrated once again, specifically on an enlarged scale. It can be seen more clearly here that a cylinder 30 is provided in the housing 4, in which cylinder a spring plate-like piston 31, i.e. one without a seal, can be moved counter to the force of a spring 32. This piston 31 is connected with the piston rod 3 and usually lies against an end wall 33 of the cylinder 30. The parts 30, 31 and 32 form a travel simulator 34 of the power-assisted brake system.

Moreover, three other pistons 35, 36 and 37 which all lie on a common axis are arranged in the housing 4. They are arranged in cylinders 38, 39 and 40 which also have the same axis, a first piston 35 which is near to the pedal being mounted on the piston rod 2 and being capable of moving in the cylinder 38 which is also near to the pedal. This piston is a locking piston 35 and bounds, as a movable wall, a locking chamber 41 which is connected to the reservoir 10 via a housing port 42. The passage through the housing port 42 is monitored by a 2/2-way solenoid valve 43 which is usually closed.

The two cylinders 39 and 40 form an emergency brake cylinder 44 for the power-assisted brake system. For this purpose, the cylinders 39 and 40 are connected on the one hand via ports 45 and 46 to the reservoir 10 and on the other hand via ports 47 and 48 to emergency brake lines 49 and 50 which lead to the wheel brakes. The respective openings of the ports 45, 46, 47 and 48 into the cylinders 39 and 40 are designed such that they are usually not covered by the two pistons 36 and 37. According to the definition which is customary with hydraulic tandem master cylinders, the piston 36 is a pressure rod piston and the piston 37 is an intermediate piston. The two openings of the ports 45 and 46 which lead to the reservoir 10 are however immediately closed off by the two pistons 36 and 37 when they move in the emergency braking direction so that the pistons 36 and 37 can produce pressure in the emergency brake cylinder 44. The pressure rod piston 36 of the emergency brake cylinder 44 is connected with a piston rod 51 which is sealed by means of an annular seal 52 provided in a housing wall. The piston rod 51 projects into the locking chamber 41, and is connected in the said locking chamber 41 to the locking piston 35 which is near to the pedal. The intermediate piston 37 of the emergency brake cylinder 44 is arranged between two springs 53 and 54, spring (53) bears against the pressure rod piston 36 and the second spring (54) of which bears against an end wall 55. The two springs 53 and 54 are arranged in chambers 56 and 57 which serve as working chambers in an emergency.

The described piston unit 5 is preferably equipped with two sensors 58 and 59. One sensor 58 is a pivot angle sensor which is installed in the coupling point 8 and indirectly indicates the pedal travel via a pivot angle measured between the pedal lever 7 and the travel simulator piston rod 3.

The second sensor 59 is a pressure sensor which detects the pressure in the locking chamber 41. The measured values from the two sensors 58 and 59 can be fed to an electronic control unit 60 and monitored there to determine whether they are each essentially of the same size or whether changes have logically taken place in the same direction. If the control unit 60 detects that the measured values are unacceptably different, it can output a fault report and/or indicate the fault indirectly by suppressing the power-assisted braking operation.

MODE OF OPERATION

If the power-assisted brake system is intact, it is operational. When the brake pedal 1 is touched gently, the 2/2-way solenoid valve 43 is closed so that the locking chamber 41 is sealed off and consequently the pedal lever 7 finds a firm support at the coupling point 6. If the pedal 1 continues to be activated, the piston rod 3 and the piston 31 are pulled to the left counter to the force of the spring 32 and the travel transmitter 58 is adjusted so that it indicates a desired value corresponding to the movement of the pedal 1. The joint 9 at the piston rod 3 permits the degree of freedom required here for moving the coupling point 8.

Since the connection between the locking chamber 41 and the reservoir 10 is closed, the volume enclosed in the locking chamber 41 remains virtually constant because of the low degree of compressibility of the brake fluid. The pressure built up in the locking chamber 41 by the force of the driver's foot is detected with the aid of the pressure sensor 59 and reported to the control unit 60 for example as a desired value. The travel of the pedal 1 is proportional to the spring travel of the simulator spring 32.

The solenoid valves 19 to 28 provided in the brake lines leading to the wheel brakes 15 to 18 permit any desired brake pressures to be produced from the pressure held in reserve in the power-assistance provision unit using at least one sensor 58 or 59 and the electronic control unit 60. This power-assisted brake system can be developed with known expertise to carry out anti-lock functions (ABS) and for example also traction control functions (TCS). In all these modes of operation, the components of the emergency brake which actually constitute a conventional tandem master cylinder are not used because the piston rod 51 does not move due to the blocking of the locking chamber 41.

However, if the provision of power-assistance and/or the electronics fail, the power-assisted brake system remains in emergency braking mode. In this case, all the solenoid valves are thus deenergized. By virtue of the emergency braking mode, the driver has available to him a complete dual-circuit brake system to be operated with muscle power.

During emergency braking, the braking energy is therefore applied solely by the force of the driver's foot. The locking chamber 41 is connected directly to the reservoir 10 (reservoir container) via the 2/2-way solenoid valve 43 which is open in the deenergized state. Since no pressure can thus be produced in the locking chamber 41, the driver builds up the brake pressure by activating the pedal 1 with the force of his own foot. This applied force of his foot is transferred mechanically to the piston rod 51 and the piston 36. As a result, a brake pressure which is passed on to the wheel brakes 15 to 19 via the brake lines 49 and 50 is produced in the two working chambers 56 and 57 of the emergency brake cylinder 44.

Since the two pistons 36 and 37 are at the far left in their initial position at the start of their working stroke, the two working chambers 56 and 57 which adjoin the pistons have their maximum volume.

Consequently, it is desirable that all the possible displacement paths of the piston are available for producing brake pressure during emergency braking by means of the emergency brake cylinder 44.

The particular advantages of the power-assisted brake system described are that the elements which are necessary for the alternative functions of desired value transmitter/travel simulator and emergency brake cylinder are accommodated in the piston unit 5. In order to change from one function to the other, all that is necessary is to switch over the 2/2-way solenoid valve 43. As already indicated in the introduction to the description, the compact design with the travel simulator 34, which is parallel to the axis of the locking chamber 41 and the emergency brake cylinder 44, in the same housing 4 is also advantageous.

The adoption of the proven basic structure of a conventional tandem master cylinder for the emergency brake cylinder is advantageous for safety.

Figure 3:
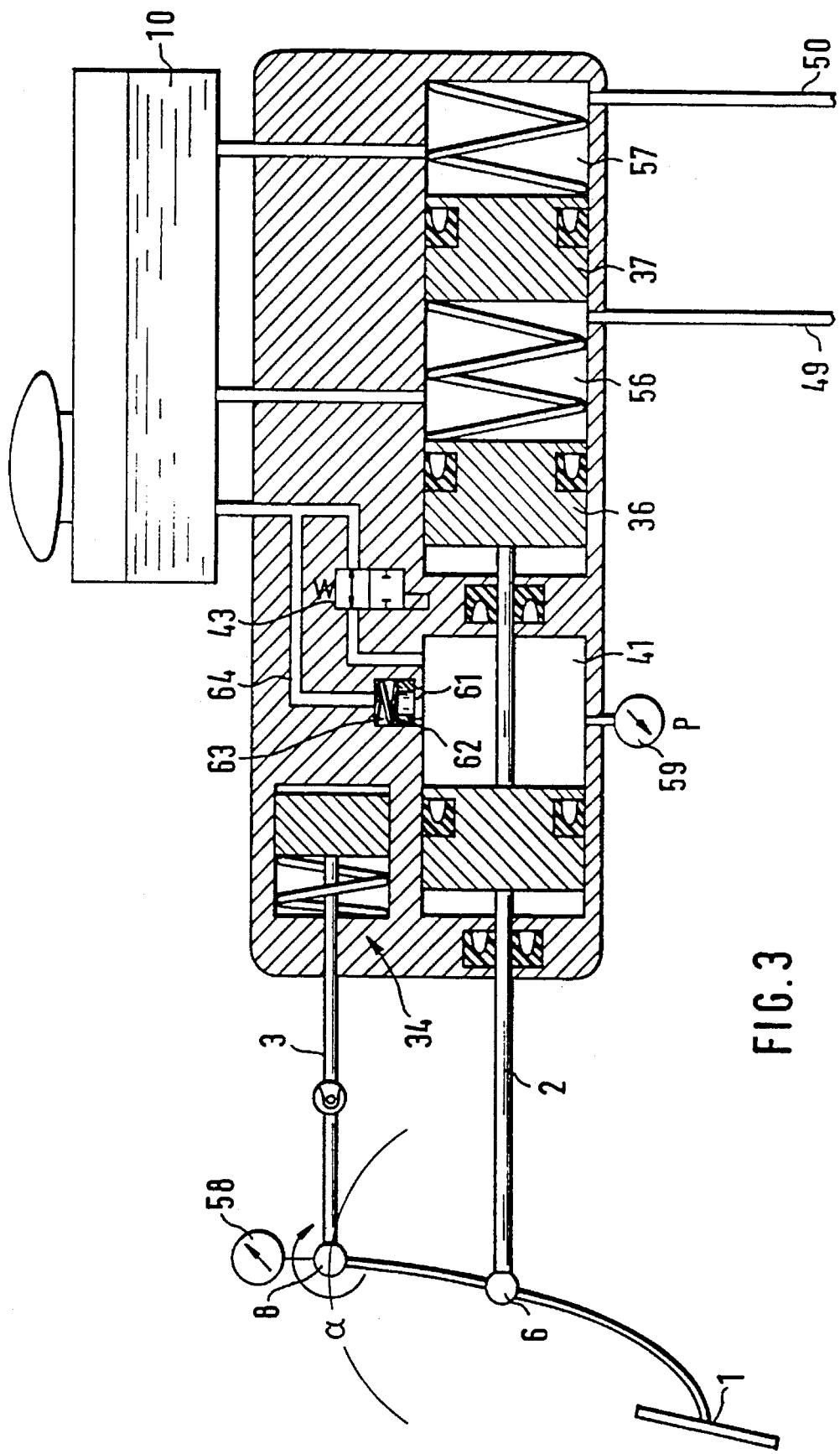
FIG. 3 shows another embodiment of the emergency brake cylinder and FIG. 4 shows another control of the travel simulator.

In FIG. 3, a power-assisted brake system is illustrated which is largely of the same design as that according to FIG. 2. Therefore, corresponding components bear the same reference numbers. However, in addition an extension chamber 61 with an extension piston 62 is provided here on the separating chamber 41, the rear of the said extension piston 62 bounding a spring space 63 which is connected to the reservoir 10 via a port 64.

The object of this variant is to permit a minimum degree of travel, e.g. approximately 1 mm, for the separating piston 35 and the two pistons 36 and 37 which have the same axis as it so that the seals in the piston unit 5 cannot become jammed, which could lead to the seals being damaged if breaking off occurs as a result of emergency braking.

The pressure built up in the piston unit 5 in the locking chamber 41 by the force of the driver's foot with an intact power-assisted brake system displaces the extension piston 62 to a minimum degree. As a result, both the locking piston 35 which bounds the locking chamber 41 and the two pistons 36 and 37 are displaced with their piston rods 2 and 51 to a minimum degree. The sealing elements (not designated in greater detail) in the piston unit 5 cannot become jammed or locked. The two connecting ports 45 and 46 to the reservoir 10 are not covered when there is such a minimum degree of movement of the pistons 36 and 37. As a result, the two working chambers 56 and 57 also continue to be connected to the reservoir 10 in a nonpressurized state so that no pressure can build up in the working chambers 56 and 57 and so that quantities of pressure medium which are to be derived from wheel brakes during power-assistance operation can escape to the reservoir 10.

If emergency braking operation takes place, the additional pedal travel until the hydraulic brake responds is negligibly small.

Figure 4:
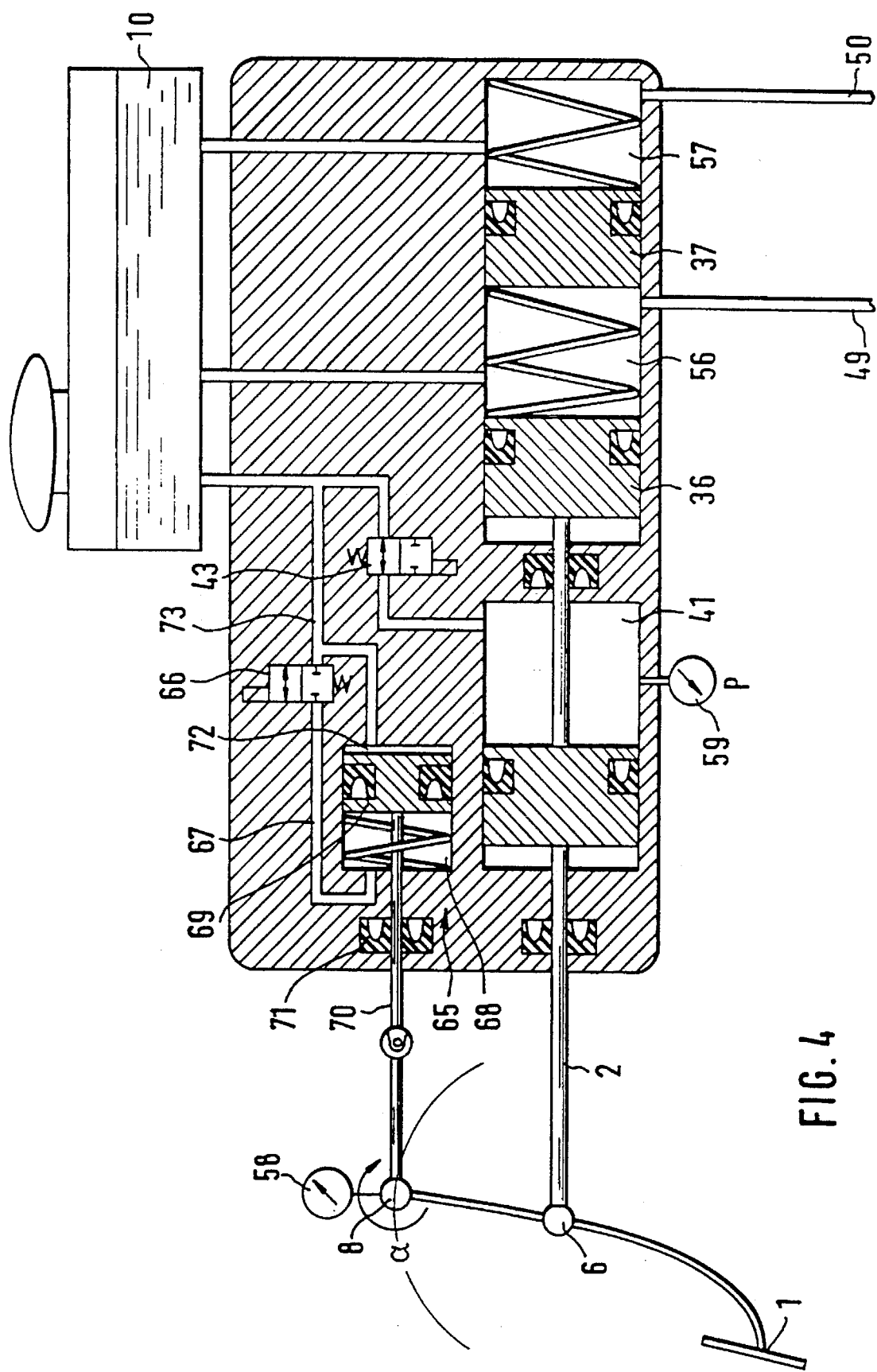

FIG. 4 shows a design in which a travel simulator 65 is supplemented by a 2/2-way solenoid valve 66 which is closed in the deenergized state. The solenoid valve 66 monitors a port 67 which extends from a spring chamber 68 of the travel simulator 65 to the reservoir 10. Furthermore, the travel simulator 65 is equipped in this design with a sealing piston 69, and its piston rod 70 passes through an annular seal 71 which is fixed to the housing. Finally, a chamber 72 which is provided on the side lying opposite the spring chamber 68 of the piston 69 is directly connected to the reservoir 10 via a port 73.

This design operates as follows:

When the power-assisted brake system is intact, the solenoid valve 66 is opened during braking by means of power assistance and the volume in the spring chamber 68 of the travel simulator 65 is expelled at least partially into the reservoir 10. Thus, the pedal travel which is advantageous for ergonomic reasons is guaranteed.

If a defect occurs in the electronics or in the power-assistance provision unit 14, the solenoid valve is deenergized. Then the spring chamber 68 of the travel simulator 65 is no longer connected to the reservoir 10 and the simulator piston 69 can no longer be displaced, i.e. the travel simulator 65 is blocked. The remaining pedal travel is then available to displace the two pistons 36 and 37.

I claim:

1. A power-assisted brake system having a valve arrangement which is controlled electrically by means of a pedal, for adjusting wheel brake pressures which are derived from a power-assistance pressure source, a travel simulator which is assigned to the pedal and an emergency brake cylinder which is activated by means of the pedal and at least one piston remains in a region of an initial position during braking with power assistance, from which initial position, an emergency brake pressure is produced during a working stroke of the piston and is fed to wheel brakes through at least one emergency brake line, a cylinder (38) includes a locking, piston (35) which is displaced therein and arranged between the pedal (1) and a piston (36) which is constructed as a pressure rod piston, an emergency piston-side locking chamber (41) is connected to a reservoir (10) via a first 2/2-way solenoid valve (43) which is closed during a power-assistance mode, and wherein the 2/2-way solenoid valve (43) is open in an emergency operation and connects the locking chamber (41) to the reservoir (10).

2. The power-assisted brake system as claimed in claim 1, wherein the locking chamber (41) is connected to an extension chamber (61).

3. The power-assisted brake system as claimed in claim 2, wherein the extension chamber (61) is bounded by an extension piston (62) as a movable wall, and includes a spring space (63) which is continuously connected to the reservoir (10) via a port (64).

4. The power-assisted brake system as claimed in claim 3, wherein the travel simulator (34, 65) is arranged parallel offset with respect to the emergency brake cylinder (39, 40), and wherein the pedal (1) is supported by a pedal lever (7) to which both a piston rod (2) of the locking piston (35) and a piston rod (3, 70) of a simulator piston (31, 69) which is arranged in the travel simulator (34, 65) are coupled.

5. The power-assisted brake system as claimed in claim 4, wherein at the coupling point (8), intended for the travel simulator (34, 65), of the pedal (1), a sensor (58) is provided in order to pick up a pivot angle and to produce a travel signal which corresponds to a travel of the piston (31) of the travel simulator (34, 65) and which is fed to the control unit (60).

6. The power-assisted brake system as claimed in claim 3, wherein a pressure sensor (59) is connected to the locking chamber (41), and wherein a pressure signal which is supplied by the pressure sensor (59) is fed to an electronic control unit (6) of the power-assisted brake system.

7. The power-assisted brake system as claimed in claim 2, wherein the travel simulator (34, 65) is arranged parallel offset with respect to the emergency brake cylinder (39, 40), and wherein the pedal (1) is supported by a pedal lever (7) to which both a piston rod (2) of the locking piston (35) and a piston rod (3, 70) of a simulator piston (31, 69) which is arranged in the travel simulator (34, 65) are coupled.

8. The power-assisted brake system as claimed in claim 7, wherein at the coupling point (8), intended for the travel simulator (34, 65), of the pedal (1), a sensor (58) is provided in order to pick up a pivot angle and to produce a travel signal which corresponds to a travel of the piston (31) of the travel simulator (34, 65) and which is fed to the control unit (60).

9. The power-assisted brake system as claimed in claim 2, wherein a pressure sensor (59) is connected to the locking chamber (41), and wherein a pressure signal which is supplied by the pressure sensor (59) is fed to an electronic control unit (6) of the power-assisted brake system.

10. The power-assisted brake system as claimed in claim 1, wherein the travel simulator (65) includes a piston (69) which separates a spring chamber (68) from a chamber (72) which is continuously connected to the reservoir (10), and wherein the spring chamber (68) is connected to the reservoir (10) via a second normally closed solenoid valve (66) which can be opened during power-assistance operation by means of an electric current.

11. The power-assisted brake system as claimed in claim 10, wherein the travel simulator (34, 65) is arranged parallel offset with respect to the emergency brake cylinder (39, 40), and wherein the pedal (1) is supported by a pedal lever (7) to which both a piston rod (2) of the locking piston (35) and a piston rod (3, 70) of a simulator piston (31, 69) which is arranged in the travel simulator (34, 65) are coupled.

12. The power-assisted brake system as claimed in claim 11, wherein at the coupling point (8), intended for the travel simulator (34, 65), of the pedal (1), a sensor (58) is provided in order to pick up a pivot angle and to produce a travel signal which corresponds to a travel of the piston (31) of the travel simulator (34, 65) and which is fed to the control unit (60).

13. The power-assisted brake system as claimed in claim 10, wherein a pressure sensor (59) is connected to the locking chamber (41), and wherein a pressure signal which is supplied by the pressure sensor (59) is fed to an electronic control unit (6) of the power-assisted brake system.

14. The power-assisted brake system as claimed in claim 1, wherein the travel simulator (34, 65) is arranged parallel offset with respect to the emergency brake cylinder (39, 40), and wherein the pedal (1) is supported by a pedal lever (7) to which both a piston rod (2) of the locking piston (35) and a piston rod (3, 70) of a simulator piston (31, 69) which is arranged in the travel simulator (34, 65) are coupled.

15. The power-assisted brake system as claimed in claim 14, wherein at the coupling point (8), intended for the travel simulator (34, 65), of the pedal (1), a sensor (58) is provided in order to pick up a pivot angle and to produce a travel signal which corresponds to a travel of the piston (31) of the travel simulator (34, 65) and which is fed to the control unit (60).

16. The power-assisted brake system as claimed in claim 15, wherein a pressure sensor (59) is connected to the locking chamber (41), and wherein a pressure signal which is supplied by the pressure sensor (59) is fed to an electronic control unit (6) of the power-assisted brake system.

17. The power-assisted brake system as claimed in claim 15, wherein the control unit is configured to monitor the travel signal of the travel sensor (58) and the pressure signal of the pressure sensor (59) for essentially corresponding valves.

18. The power-assisted brake system as claimed in claim 14, wherein a pressure sensor (59) is connected to the locking chamber (41), and wherein a pressure signal which is supplied by the pressure sensor (59) is fed to an electronic control unit (6) of the power-assisted brake system.

19. The power-assisted brake system as claimed in claim 1, wherein a pressure sensor (59) is connected to the locking chamber (41), and wherein a pressure signal which is supplied by the pressure sensor (59) is fed to an electronic control unit (6) of the power-assisted brake system.

20. The power-assisted brake system as claimed in claim 19, wherein the control unit is configured to monitor the travel signal of the travel sensor (58) and the pressure signal of the pressure sensor (59) for essentially corresponding valves.

* * * * *